United States Patent [19]
Kim

[11] Patent Number: 6,118,921
[45] Date of Patent: Sep. 12, 2000

[54] APPARATUS AND METHOD FOR REPRODUCING A VIDEO SEGMENT FOR A DIGITAL VIDEO CASSETTE RECORDER

[75] Inventor: Yong-Je Kim, Kyungki-do, Rep. of Korea

[73] Assignee: Samsung Electronics Co., Ltd., Kyungki-Do, Rep. of Korea

[21] Appl. No.: 08/714,429

[22] Filed: Sep. 16, 1996

[30] Foreign Application Priority Data

Sep. 14, 1995 [KR] Rep. of Korea .................. 95-30080

[51] Int. Cl.$^7$ ..................................... H04N 5/91
[52] U.S. Cl. ............................ 386/68; 386/111; 386/124
[58] Field of Search ..................... 386/6, 7, 8, 33, 386/40, 68, 76, 77, 81, 82, 109, 111, 112, 116, 124; 360/8, 32, 48; H04N 5/783, 5/92, 5/93

[56] References Cited

U.S. PATENT DOCUMENTS

| 5,392,129 | 2/1995 | Ohtaka et al. | 358/336 |
| 5,692,092 | 11/1997 | Nogami et al. | 386/68 |
| 5,699,474 | 12/1997 | Suzuki et al. | 386/68 |
| 5,946,446 | 8/1999 | Yanagihara | 386/68 |

FOREIGN PATENT DOCUMENTS

| 0 554 871 A2 | 8/1993 | European Pat. Off. . |
| 0 580 329 A2 | 1/1994 | European Pat. Off. . |
| 0 624 990 A2 | 11/1994 | European Pat. Off. . |
| 09065282 | 7/1997 | Japan . |

OTHER PUBLICATIONS

Yamamitsu et al., "A Study on Trick Plays for Digital VCR", IEEE Transactions on Consumer Electronics. 37(1991) Aug., No. 3, NY., pp. 261–266.

Primary Examiner—Wendy Garber
Assistant Examiner—Christopher Onuaku
Attorney, Agent, or Firm—Sughrue, Mion, Zinn, Macpeak & Seas, PLLC

[57] ABSTRACT

A video segment reproducing apparatus and method for a digital video cassette recorder are disclosed. The method includes the steps of: error-correction decoding reproduced sync block data; determining whether there is any remaining error in the error-corrected sync block data, selecting the error-corrected sync block data in the previous frame if an error remains, and selecting the error-corrected sync block data in the current frame if no error remains; saving the selected sync block data in a frame buffer; forming a segment with selected sync blocks; determining whether the data is reproduced in a variable-speed mode and processing continuous data bits only between DCT blocks within a sync block when the data is reproduced in variable-speed, and processing continuous data bits between DCT blocks within a sync block and between sync blocks within a video segment if not; variable-length decoding the processed data; and performing an inverse discrete cosine transform (IDCT) operation for the variable-length decoded data. A decision regarding the continuity of data and the corresponding data processing is not needed, and thus the DVCR can minimize the refresh time of the data frame to be displayed.

10 Claims, 5 Drawing Sheets

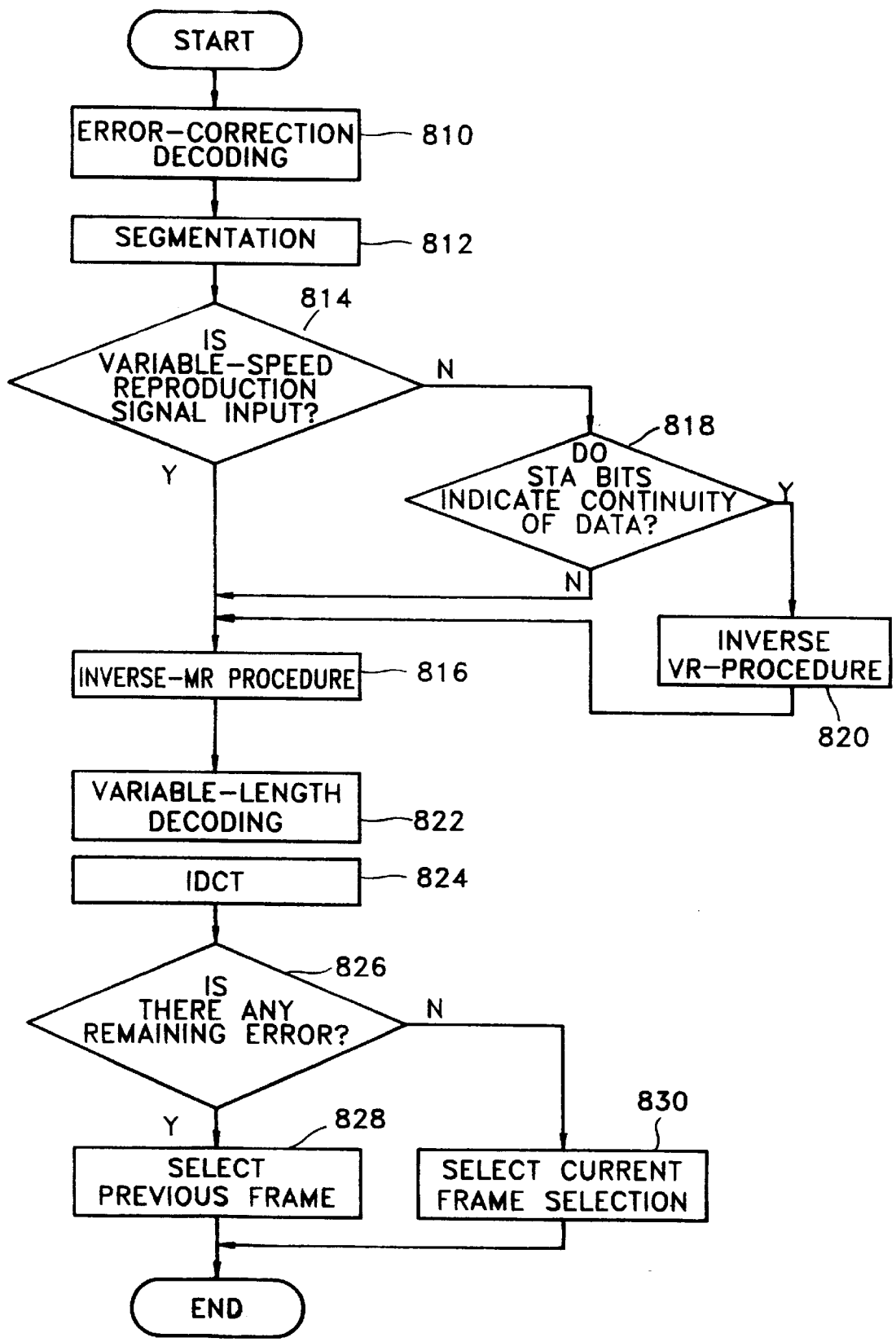

APPARATUS AND METHOD FOR REPRODUCING A VIDEO SEGMENT FOR A DIGITAL VIDEO CASSETTE RECORDER

BACKGROUND OF THE INVENTION

The present invention relates to an apparatus and method for reproducing a video segment for a digital video cassette recorder (DVCR), and more particularly, to an apparatus and method for rapidly reproducing a video segment recorded in a recording medium when the DVCR operates in a variable speed mode.

Generally, in a DVCR which uses data compression, a head can read data of an entire track and data of each track are continuously restored during a normal reproduction mode. During a variable-speed or high-speed reproduction mode, however, the complete reproduction of data is impossible since the head passes neighboring tracks and reads only a portion of the compressed data of each track instead of reading an entire track precisely.

For this reason, a standard for processing signals in a DVCR has been proposed in which video data is arranged hierarchically, i.e., in DCT blocks, macro blocks or sync blocks, super blocks, and segments. Also, a track format is to be decided such that basic picture information and the remaining high frequency signal can be demodulated and decoded in a variable-speed reproduction, and data of a desired track or location can be easily accessed by control of a servo.

However, the conventional technique has significant drawbacks in that it is practical only at speeds lower than a predetermined speed level and errors occur due to the difficulty associated with controlling a servo during a reproduction procedure beyond the predetermined speed level.

SUMMARY OF THE INVENTION

It is an object of the present invention to provide a video segment reproducing apparatus for a digital video cassette recorder, for rapidly composing a frame of video data by skipping an inverse video segment residual (inverse-VR) procedure during a variable-speed reproduction.

It is another object of the present invention to provide a video segment reproducing method for a digital video cassette recorder, for rapidly composing a frame of video data by skipping an inverse video segment residual (inverse-VR) procedure during a variable-speed reproduction.

To achieve the above first object according to an embodiment of the present invention, there is provided a video segment reproducing apparatus for a digital video cassette recorder, for reproducing a video segment consisting of 5 sync blocks, state information bits and quantization information bits, comprising: an error correction portion for error-correction decoding of reproduced sync block data; a frame memory for storing video data in a frame unit; a controller for inputting data output from the error correction portion, detecting remaining errors in the data, controlling of writing and reading of data to and from the frame memory, and outputting a variable-speed reproduction signal during a variable-speed reproduction procedure; a segmentation portion for forming a segment with the data output from the controller; and a variable-length decoder for processing continuous data bits between DCT blocks within a sync block or between sync blocks within a video segment, and variable-length decoding the processed data; wherein the variable-length decoder processes continuous data bits only between DCT blocks within a sync block when the controller outputs the variable-speed reproduction signal.

To achieve the above first object according to another embodiment of the present invention, there is provided a video segment reproducing apparatus for a digital video cassette recorder, for reproducing a video segment consisting of 5 sync blocks, state information bits and quantization information bits, comprising: an error correction portion for error-correction decoding of reproduced sync block data; a first frame memory for storing video data in a frame unit; a controller for inputting data output from the error correction portion, detecting remaining errors in the data, controlling of writing and reading data to and from the first frame memory, and outputting a variable-speed reproduction signal during a variable-speed reproduction procedure; a segmentation portion for forming a segment with the data output from the controller; a variable-length decoder for processing continuous data bits between DCT blocks within a sync block or between sync blocks within a video segment, and variable-length decoding the processed data; an IDCT operator for carrying out inverse discrete cosine transform (IDCT) operation for the DCT block data output from the variable-length decoder; a second frame memory for storing inverse discrete cosine transformed data in a frame unit; and a memory controller for inputting data output from the IDCT operator and controlling of writing and reading of data to and from the second frame memory; wherein the variable-length decoder processes continuous data bits only between DCT blocks within a sync block when the controller outputs the variable-speed reproduction signal.

To achieve the above second object according to an embodiment of the present invention, there is provided a video segment reproducing method for a digital video cassette recorder, for reproducing a video segment consisting of 5 sync blocks, state information bits and quantization information bits, comprising the steps of: error-correction decoding reproduced sync block data; determining whether there is any remaining error in the error-corrected sync block data, to select the error-corrected sync block data in the previous frame if an error remains, and select the error-corrected sync block data in the current frame if no error remains; saving the selected sync block data in a frame buffer; forming a segment with selected sync blocks; determining whether the data is reproduced in variable-speed to process continuous data bits only between DCT blocks within a sync block when the data is reproduced in variable-speed, and process continuous data bits between DCT blocks within a sync block and between sync blocks within a video segment if not; variable-length decoding the processed data; and performing an inverse discrete cosine transform (IDCT) operation for the variable-length decoded data.

To achieve the above second object according to another embodiment of the present invention, there is provided a video segment reproducing method for a digital video cassette recorder, for reproducing a video segment consisting of 5 sync blocks, state information bits and quantization information bits, comprising the steps of: error-correction decoding reproduced sync block data; saving the sync block data in a first frame buffer; forming a segment with a predetermined number of sync blocks; determining whether the data is reproduced in variable-speed to process continuous data bits only between DCT blocks within a sync block when the data is reproduced in variable-speed, and process continuous data bits between DCT blocks within a sync block and between sync blocks within a video segment if not; variable-length decoding the processed data; performing an inverse discrete cosine transform (IDCT) operation for the variable-length decoded data; determining whether there is any remaining error in the variable-length decoded sync block data, to select the variable-length decoded sync block data in the previous frame if an error remains, and select the variable-length decoded sync block data in the current frame if no error remains.

BRIEF DESCRIPTION OF THE DRAWINGS

The above objects and advantages of the present invention will become more apparent by describing preferred embodiments of the present invention with reference to the attached drawings in which:

FIG. 8 is a flow chart illustrating the video segment reproducing method of the digital video cassette recorder shown in FIG. 4.

DETAILED DESCRIPTION OF THE PRESENT INVENTION

Figure 1:
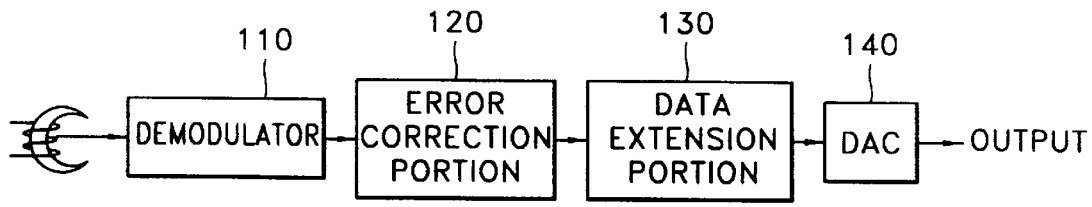
FIG. 1 is a block diagram of the reproducing unit of a general digital video cassette recorder (DVCR)

FIG. 1 shows the reproducing unit of a general digital video cassette recorder (DVCR). Specifically, the DVCR includes a demodulator 110, an error correction portion 120, a data extension portion 130, and a digital-to-analog converter (DAC) 140.

The demodulator 110 inputs a data signal read out by a head, and demodulates such signal. The error correction portion 120 error correction-decodes the demodulated signal. The data extension portion 130 performs a variable-length decoding and an inverse discrete cosine transform (IDCT) operation on the error-corrected data signal. The digital to-analog converter (DAC) 140 converts the digital signal output from the data extension portion 130 to an analog signal.

Figure 2:
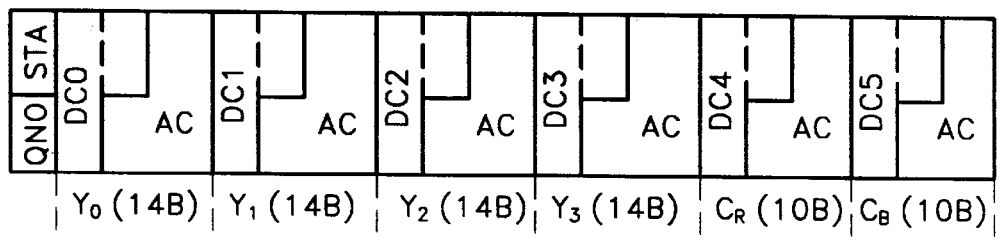
FIG. 2 illustrates the arrangement of a sync block of compressed digital video data of the general DVCR.

FIG. 2 illustrates the arrangement of a sync block of compressed digital video data of the general DVCR.

Referring to FIG. 2, a sync block is composed of 4 luminance component blocks, Y0, Y1, Y2 and Y3, and 2 color difference component blocks, $C_R$ and $C_B$, and an additional information byte. Each of the luminance component blocks consists of 14 bytes, and each of the color difference component blocks consists of 10 bytes. Meanwhile, each of the luminance and color difference component blocks has a direct current (DC) coefficient and a variable-length code of an alternating current (AC) coefficient. The additional information byte consists of 4 state (STA) bits which represent the information for error and concealment of the block, and 4 quantization number (QNO) bits which represent the information for quantization. Thus, the total number of bytes in a sync block is 77 bytes. on the other hand, 5 sync blocks described above make up a video segment.

Figure 3:
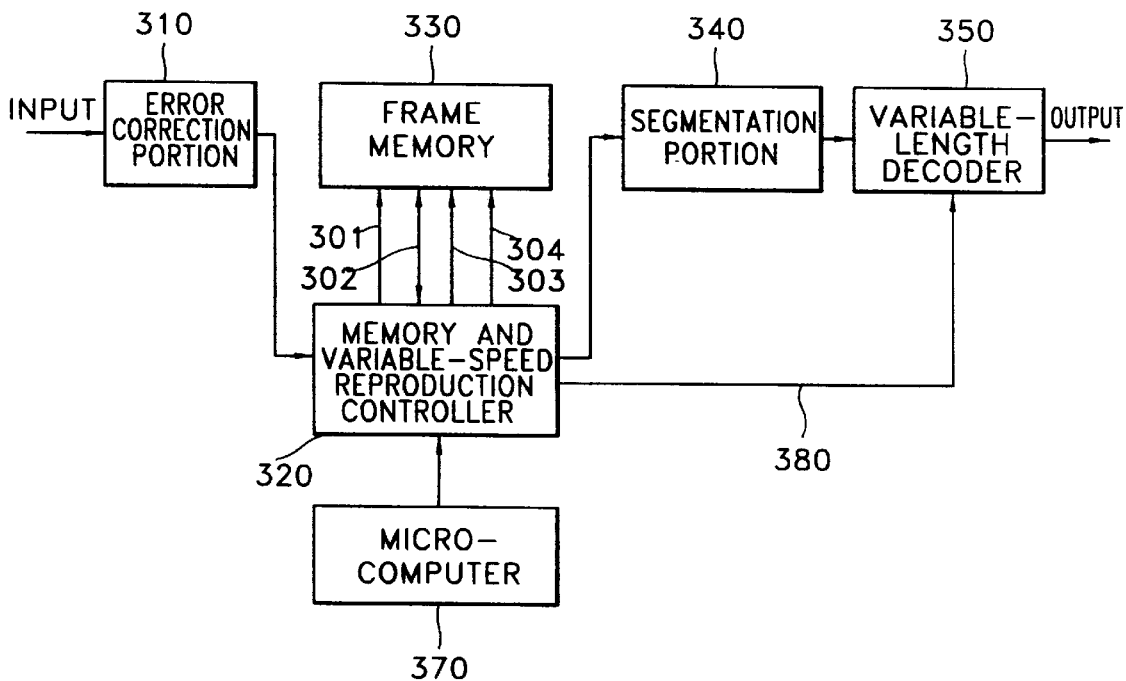
FIG. 3 is a block diagram of a video segment reproducing apparatus for a digital video cassette recorder according to an embodiment of the present invention.

FIG. 3 is a block diagram of a video segment reproducing apparatus for a digital video cassette recorder according to an embodiment of the present invention.

Referring to FIG. 3, the video segment reproducing apparatus for a digital video cassette recorder includes an error correction portion 310, a frame memory 330, a memory and variable-speed reproduction controller 320, a microcomputer 370, a segmentation portion 340, and a variable length decoder 350.

The error correction portion 310 corrects errors of compressed video input data. The frame memory 330 receives compressed video data output from the error correction portion 310 via the controller 320, and stores such data in one frame unit.

The memory and variable-speed reproduction controller 320 is connected to the frame memory 330 by an address signal line 301, a data signal line 302, a read enable signal line 303, and a write enable signal line 304. The controller 320 controls the frame memory 330 and a variable-speed reproduction procedure. The microcomputer 370 outputs a variable-speed reproduction control signal to the controller 320.

The segmentation portion 340 composes every five sync blocks of video data output from the controller 320 to form a video segment. The variable-length decoder 350 decodes the signal output from the segmentation portion 340 in accordance with the variable-speed reproduction signal output from the controller 320.

The operation of the video segment reproducing apparatus shown in FIG. 3 will be described below.

During the recording, compression-coding is independently carried out in a segment unit of 5 sync blocks as shown in FIG. 2, and generates the same size of codes for each segment.

The error correction portion 310 inputs the demodulated digital video signal of Reed-Solomon (R-S) code, and performs error-correction decoding of such signal. Further, the error correction portion 310 sets the STA bits in accordance with the error-correction procedure.

That is, if there exists a remaining error in the sync block even after the data has passed through the error correction procedure, the STA bits are set to 1111 to indicate the error. Also, if there is no error, the STA bits are set to 0000. On the other hand, when the current sync block is to be replaced by the sync block in the previous frame and the data processing sequence is continuous with the other sync blocks within the same video segment, the STA bits are set to 0010.

The memory and variable-speed reproduction controller 320 inputs the error-corrected data output from the error-correcting portion 310, and writes sequentially such data in the frame memory 330. Also, the controller 320 reads data from the frame memory 330 and outputs such data to the segmentation portion 340.

In case that the STA bits are 1111, however, the controller 320 disables the write enable signal line 304 to prevent current data from being written into the frame memory 330. Thus, a sync block of the previous frame is maintained in this case.

Therefore, the sync block data transmitted to the segmentation portion 340 could be the current frame data or the previous frame data, depending on the STA bits. Here, since the entire area of the motion picture is almost similar to that of the previous picture, the difference cannot be recognized even though the current frame is partially replaced by the previous frame.

The segmentation portion 340 inputs sync blocks from the controller 320, composes every five sync blocks to form a video segment, and transmits the segment to the variable length decoder 350.

The variable-length decoder 350 decodes the Huffman code input from the segmentation portion 340. Here, when a variable-speed reproduction control signal for controlling the decoding process is applied to controller 320 from the microcomputer 370, the controller 320 generates a variable-speed reproduction signal and applies such signal to the variable-length decoder 350 after a temporal delay time to match a decoding timing. The variable-speed reproduction signal affects the decoding process depending on the STA bits shown in FIG. 2. In other words, 5 sync blocks input to the variable-length decoder 350 undergo different decoding processes according to the STA bits which indicate the continuity of data processing sequence.

Specifically, a separate recording space is provided for each decoding block, during the recording. All the recording spaces record preferentially a Huffman codeword generated for its own block. If any recording space is not enough to accommodate the corresponding Huffman codeword, the residual bits are recorded in the least significant bits of the other recording spaces within the same sync block (this is called a macro block residual (MR) procedure). Also, if there are still residual bits after the MR procedure, a residual code procedure is carried out between sync blocks within the same video segment (this is called a video segment residual (VR) procedure).

Figure 6:
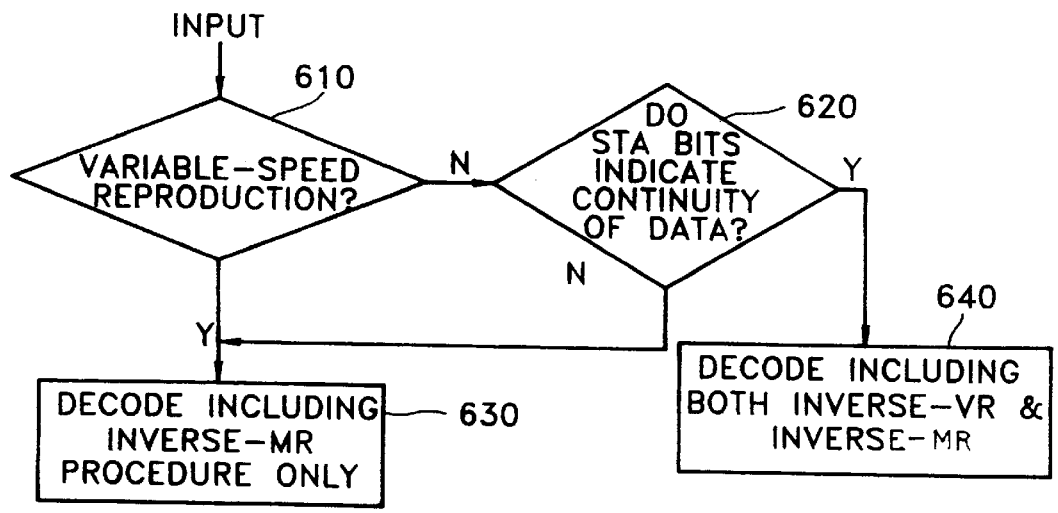
FIG. 6 is a flow chart illustrating the data processing in the variable length decoders of FIGS. 3 and 4.

As a result, inverse procedures of the MR and VR procedures are required during reproduction. FIG. 6 is a flow chart illustrating the operation of the variable-length decoder 350 shown in FIG. 3.

Referring to FIG. 6, if it is determined that a data input to the variable-length decoder 350 is reproduced in variable-speed in the step 610, the decoding of data is performed including only an inverse-MR procedure which processes data within its own sync block regardless of the continuity of the data (step 630). Otherwise, the continuity of data between video segments is tested by use of the STA bits (step 620). If there is continuity of data, decoding is carried out including both the inverse-VR and inverse-MR procedures (step 640). If there is no continuity, however, decoding is carried out including only the inverse-MR procedure (step 630).

Here, in case of leaving out inverse-VR procedure for a variable-speed reproduction, there is a disadvantage that high-frequency components cannot be recovered. However, there is an advantage that a decision regarding the continuity of data and the corresponding data processing are not needed, and thus the DVCR can minimize the refresh time of the data frame to be displayed. Further, since it is so difficult to observe high-frequency components in a variable-speed reproduction, it is sufficient to carry out only an MR procedure.

Finally, the digital video data signal decoded in the variable-length decoder 350 is output to an output port.

Figure 4:
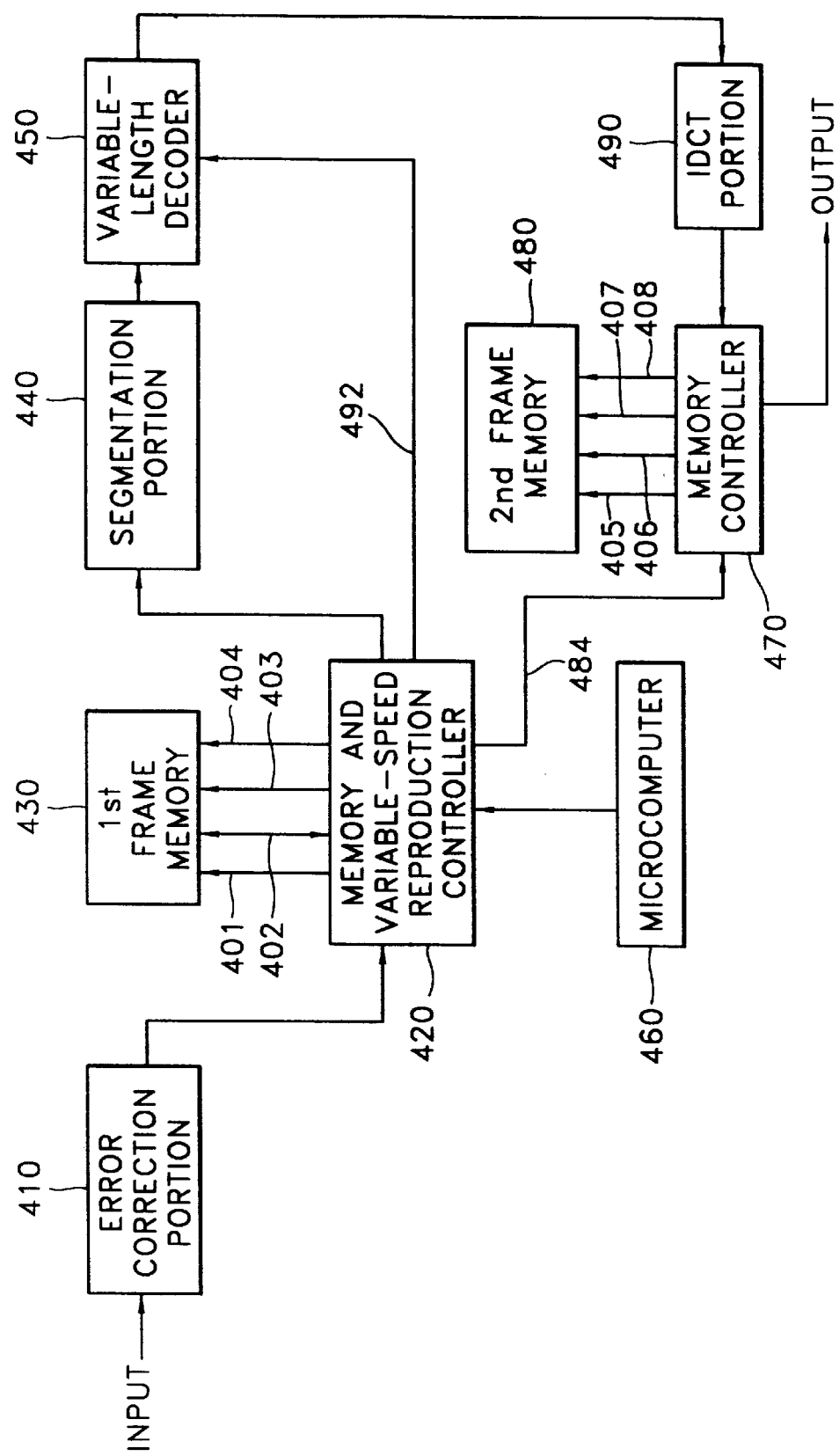
FIG. 4 is a block diagram of a video segment reproducing apparatus for a digital video cassette recorder according to another embodiment of the present invention.

FIG. 4 is a block diagram of a video segment reproducing apparatus for a digital video cassette recorder according to another embodiment of the present invention.

The video segment reproducing apparatus for a DVCR shown in FIG. 4 includes an error correction portion 410, a first frame memory 430, a memory and variable-speed reproduction controller 420, a microcomputer 460, a segmentation portion 440, a variable-length decoder 450, an inverse discrete cosine transform (IDCT) portion 490, a second frame memory 480, and a memory controller 470.

The error correction portion 410 corrects errors in compressed video input data. The first frame memory 430 receives compressed video data output from the error correction portion 410 via the memory and variable-speed reproduction controller 420, and stores such data.

The memory and variable-speed reproduction controller 420 is connected to the first frame memory 430 by an address signal line 401, a data signal line 402, a read enable signal line 403, and a write enable signal line 404. The controller 420 controls the first frame memory 430 and a variable-speed reproduction procedure. The microcomputer 460 outputs a variable-speed reproduction control signal to the controller 420.

The segmentation portion 440 inputs sync blocks of video data output from the controller 420 and composes every five sync blocks to form a video segment. The variable-length decoder 450 decodes the signal output from the segmentation portion 440 in accordance with the variable-speed reproduction signal output from the controller 420. The inverse discrete cosine transform (IDCT) portion 490 performs an IDCT operation with respect to a codeword output from the variable-length decoder 450.

The second frame memory 480 receives data output from the IDCT portion 490 via the memory controller 470, and stores such data. The memory controller 470 is connected to the second frame memory 480 by an address signal line 405, a data signal line 406, a read enable signal line 407, and a write enable signal line 408, and controls the second frame memory 480 according to a control signal output from the memory and variable-speed reproduction controller 420.

In FIG. 4, the first frame memory 430 stores compressed frame data and the second frame memory 480 stores variable-length decoded data. Therefore, the size of the second frame memory 480 is several times larger than that of the first frame memory 430.

The operation of the video segment reproducing apparatus shown in FIG. 4 will be described below.

The memory and variable-speed reproduction controller 420 inputs the error-corrected data output from the error correction portion 410, and writes such data to the first frame memory 430 regardless of the status of the STA bits of a sync block. Also, the controller 420 reads data from the first frame memory 430 to transmit such data to the segmentation portion 440 under the control of the microcomputer 460.

The segmentation portion 440 inputs data output from the controller 420. Subsequently, the segmentation portion 440 forms a video segment of 5 sync blocks, and transmits the segment to the variable-length decoder 450.

The variable-length decoder 450 decodes the Huffman code input from the segmentation portion 440. Here, when a variable-speed reproduction control signal for controlling the decoding process is applied to controller 420 from the microcomputer 460, the controller 420 generates a variable-speed reproduction signal and applies such signal to the variable-length decoder 450 after a temporal delay time to match a decoding timing. The variable-speed reproduction signal affects the decoding process depending on the STA bits shown in FIG. 2. In other words, a decoding process is not carried out for a sync block with an error (i.e., the STA bits are 1111). Also, for the other sync blocks with no error, the decoding process is carried out including only an inverse-MR procedure in the same manner as described regarding the first embodiment of the invention shown in FIG. 3.

Video data decoded by the variable-length decoder 450 is converted into original data by IDCT portion 490 to be input to the memory controller 470.

The memory controller 470 inputs the data output from the IDCT portion 490, writes sequentially such data in the second frame memory 480, and outputs the data. Here, writing and reading of video data between the second frame memory 480 and the memory controller 470 are accomplished through the address signal line 405, data signal line 406, read enable signal line 407, and write enable signal line 408.

When the STA bits are 1111, the memory controller 470 recognizes the error by receiving a variable-speed reproduction signal 484 from the memory and variable-speed reproduction controller 420. Then, the memory controller 470 disables the write enable signal line 408 at the address to prevent current data from being written to the second frame memory 480. Further, the memory controller 470 outputs the previous frame data read out from the second frame memory 480 instead of the current frame data received from the IDCT portion 490. Thus, the output data could be the current frame data or the previous frame data, depending on the STA bits.

Here, since the entire area of the motion picture is similar to that of the previous picture, the difference can not be recognized even though the current frame is partially replaced by the previous frame.

Figure 5:
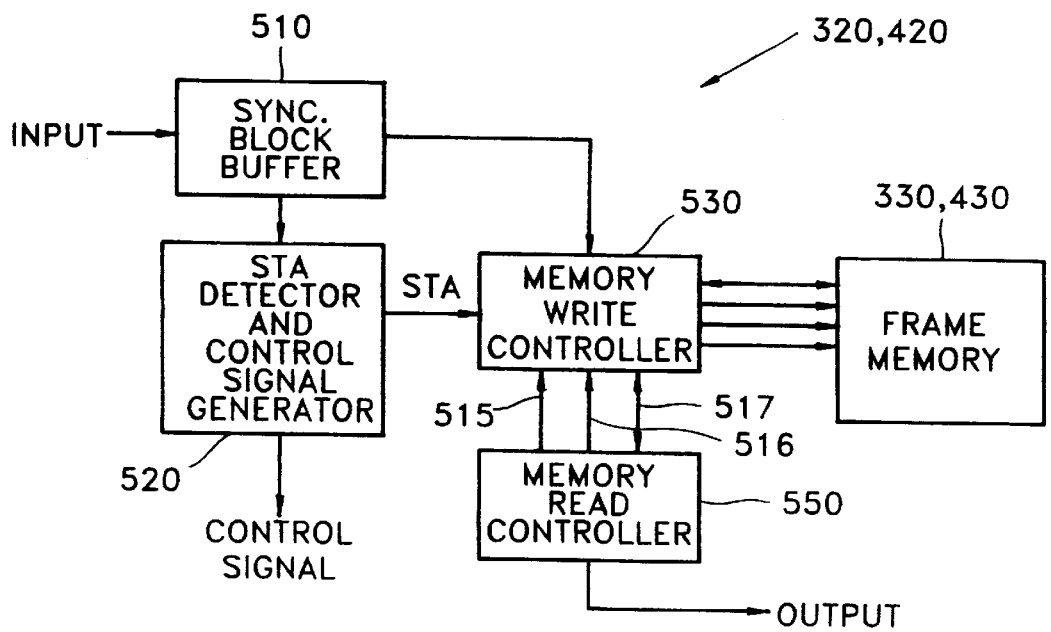
FIG. 5 is a detailed block diagram of the memory and variable-speed reproduction controller of FIGS. 3 and 4.

FIG. 5 is a detailed block diagram of the memory and variable-speed reproduction controllers 320 and 420 shown in FIGS. 3 and 4, respectively. In FIG. 5, the frame memory 420 or 430 is included with the controller 320 and 420 to make it easy to understand.

Each of the memory and variable-speed reproduction controllers 320 and 420 includes a sync block buffer 510, an STA detector and control signal generator 520, a memory write controller 530, and a memory read controller 550.

The sync block buffer 510 inputs data output from the error correction portions 310 and 410 shown in FIGS. 3 and 4, respectively, and stores such data in a sync block unit. Afterwards, the sync block buffer 510 outputs the sync block data to the STA detector and control signal generator 520 and the memory write controller 530.

The STA detector and control signal generator 520 detects an STA bits of the sync block data output from the sync block buffer 510 and generates an STA detection signal and a control signal.

The memory write controller 530 writes data received from the sync block buffer 510 in the frame buffer, depending on the STA detection signal output from the STA detector and control signal generator 520. If the STA detection signal detected in the STA detector and control signal generator 520 specifies a data error, the writing of the sync block data in the frame memory is prohibited.

The memory read controller 550 is connected to the memory write controller 530 by an address signal line 515, a data signal line 517, and a read enable signal line 516. The memory read controller 550 reads data from the frame memory 540 via the memory write controller 530, and outputs such data to an output port.

Figure 7:
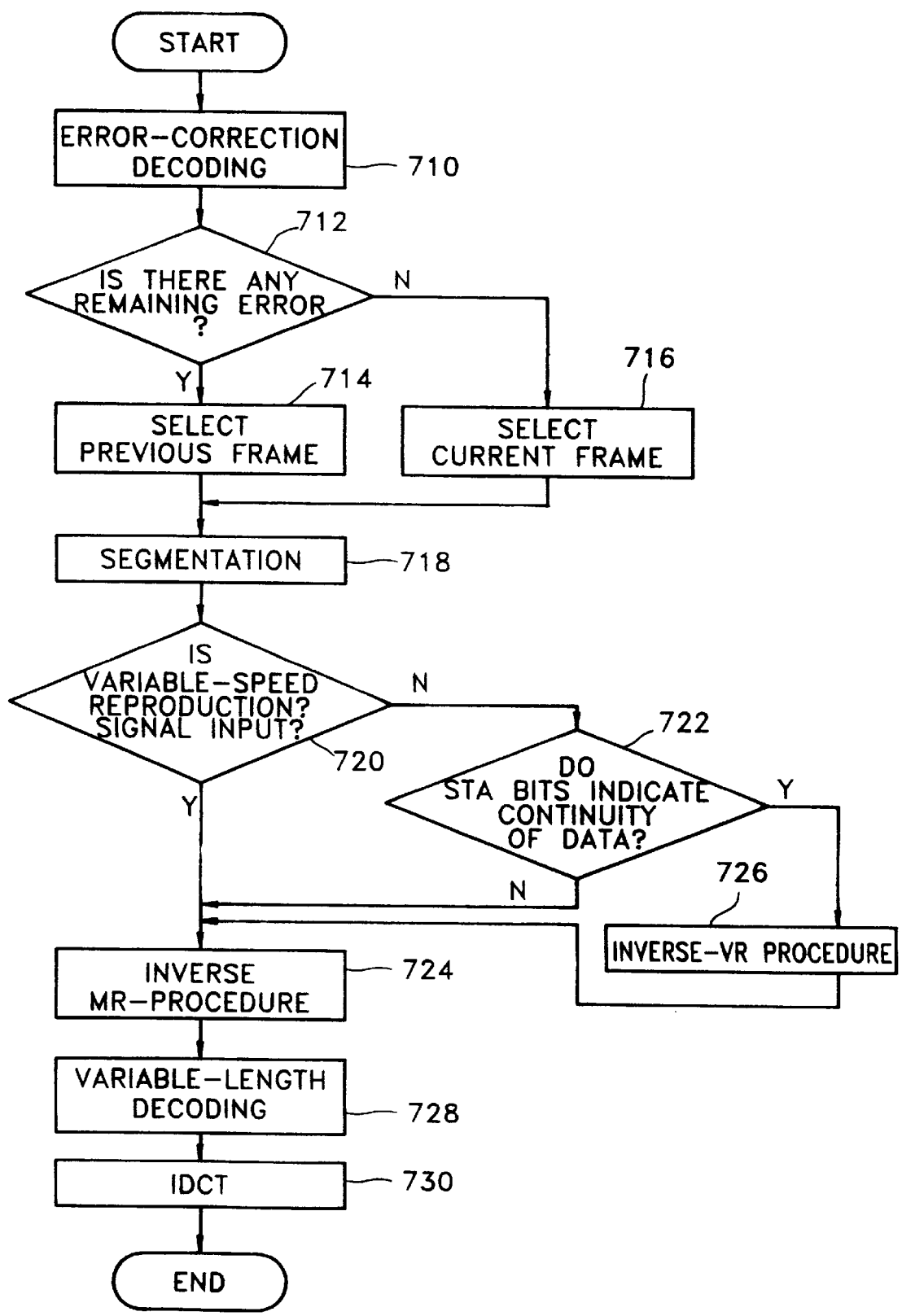
FIG. 7 is a flow chart illustrating the video segment reproducing method of the digital video cassette recorder shown in FIG. 3.

FIG. 7 is a flow chart describing the video segment reproduction method for the digital video cassette recorder shown in FIG. 3.

The method shown in FIG. 7 includes error processing steps 710, 712, 714 and 716, a segmentation step 718, variable-length decoding steps 720, 722, 724, 726 and 728, and an IDCT performing step 730.

First, in FIG. 7, a signal reproduced from a recording media is error-correction decoded (step 710). Then, whether any error remains in the error-corrected data is tested (step 712). If there is any error, sync block data in the previous frame is selected (step 714). Otherwise, sync block data in the current frame is selected (step 716).

Every five sync blocks are combined to form a segment (step 718). Subsequently, the thus-formed data in the segment unit undergoes a variable-length decoding process. Before the variable-length decoding, an input of a variable-speed reproduction signal from the microcomputer 370 is detected (step 720). If there is an input of a variable-speed reproduction signal, an inverse-MR procedure for processing data within its own sync block is carried out (step 724). However, if there is no input of the variable-speed reproduction signal, the continuity of data is tested by use of the STA bits (step 722). If there is continuity, an inverse-VR procedure for processing data between sync blocks within the same video segment is carried out (step 726). Afterwards, the DCT data is variable-length decoded.

Finally, the variable-length decoded DCT data undergoes an IDCT operation process (step 730) for converting such data into luminance and color difference component data to be output as video data.

FIG. 8 is a flow chart describing the video segment reproduction method of the digital video cassette recorder shown in FIG. 4.

The method shown in FIG. 8 includes segmentation steps 810 and 812, variable-length decoding steps 814, 816, 818, 820 and 822, an IDCT performing step 824, and error test steps 826, 828 and 830.

First, in FIG. 8, a signal reproduced from a recording media is error-correction decoded (step 810). In the segmentation step 812, every five error-corrected sync blocks are combined to form a segment.

Before the variable-length decoding, an input of a variable-speed reproduction signal from the microcomputer 460 is detected (step 814). If there is an input of a variable-speed reproduction signal, an inverse-MR procedure for processing data within its own sync block is carried out (step 816). However, if there is no input of the variable-speed reproduction signal, the continuity of data is tested by use of the STA bits (step 818). If there is continuity, an inverse-VR procedure for processing data between sync blocks within the same video segment is carried out (step 820). Afterwards, the DCT data is variable-length decoded.

Next, the variable-length decoded DCT data undergoes an IDCT operation process (step 824) for converting such data into luminance and color difference component data to be output as video data.

Finally, whether any error remains in the IDCT-processed sync block is tested (step 826). If there is any error, the sync block data in the previous frame data is selected (step 828). Otherwise, the sync block data in the current frame is selected.

As described above, in a DVCR according to the present invention, there is an advantage that the refresh time of a displayed picture data, in variable-speed reproduction, can be minimized to recompose a normal picture.

What is claimed is:

1. A video segment reproducing apparatus for a digital video cassette recorder, for reproducing a video segment consisting of a predetermined number of sync blocks, state information bits and quantization information bits, said apparatus comprising:

an error correction portion for error-correction decoding of reproduced sync block data;

a frame memory for storing video data in a frame unit;

a controller for inputting error-corrected data output from said error correction portion, detecting remaining errors in the error-corrected data, controlling of writing and reading of the error corrected data to and from said frame memory, and outputting a variable-speed reproduction signal during a variable-speed reproduction procedure;

a segmentation portion for forming the video segment with the data output from said controller; and a variable-length decoder for processing continuous data bits between discrete cosine-transformed (DCT) blocks within one of the predetermined number of sync blocks or between ones of the predetermined number of sync blocks within the video segment, and variable-length decoding the processed data;

wherein said variable-length decoder processes continuous data bits only between DCT blocks within one of the predetermined number of sync blocks in response to said controller outputting the variable-speed reproduction signal, and said variable-length decoder processes continuous data bits between ones of the predetermined number of sync blocks within the video segment when said controller does not output the variable-speed reproduction signal.

2. A video segment reproducing apparatus for a digital video cassette recorder, for reproducing a video segment consisting of a predetermined number of sync blocks, state information bits and quantization information bits, the apparatus comprising:

an error correction portion for error-correction decoding reproduced sync block data and outputting error-corrected data;

a first frame memory for storing video data in a frame unit;

a controller for inputting the error-corrected data output from said error correction portion, detecting remaining errors in the error-corrected data, controlling of writing and reading the error corrected data to and from said first frame memory, and outputting a variable-speed reproduction signal during a variable-speed reproduction procedure;

a segmentation portion for forming the video segment with the data output from said controller;

a variable-length decoder for processing continuous data bits between discrete cosine-transformed (DCT) blocks within one of the predetermined number of sync blocks or between ones of the predetermined number of sync blocks within the video segment, thereby producing processed data, and variable-length decoding the processed data, thereby outputting DCT block data;

an inverse discrete cosine transform (IDCT) operator for carrying out an inverse discrete cosine transform (IDCT) operation on the DCT block data output from said variable-length decoder;

a second frame memory for storing inverse discrete cosine transformed data in a frame unit; and, a memory controller for inputting the data output from said IDCT operator and controlling writing and reading of the data output from said IDCT operator to and from said second frame memory;

wherein said variable-length decoder processes continuous data bits only between DCT blocks within a sync block in response to said controller outputting the variable-speed reproduction signal, and said variable-length decoder processes continuous data bits between ones of the predetermined number of sync blocks within the video segment when said controller does not output the variable-speed reproduction signal.

3. A video segment reproducing method for a digital video cassette recorder, for reproducing a video segment consisting of a predetermined number of sync blocks, state information bits and quantization information bits, the method comprising the steps of:

error-correction decoding reproduced sync block data;

determining whether there is any remaining error in the error-corrected sync block data, and selecting the error-corrected sync block data in the previous frame if an error remains, and selecting the error-corrected sync block data in a current frame if no error remains;

saving the selected sync block data in a frame buffer;

forming a segment with selected sync block data corresponding to the predetermined number of sync blocks;

determining whether or not the sync block data is reproduced in a variable-speed mode and processing continuous data bits only between DCT blocks within one of the predetermined number of sync blocks when it is determined that the sync block data is reproduced in the variable-speed mode, and processing continuous data bits between DCT blocks within one of the predetermined number of sync blocks and between ones of the predetermined number of sync blocks within the video segment when it is determined that the sync block data is not reproduced in the variable-speed mode, thereby producing processed data;

variable-length decoding the processed data; and performing an inverse discrete cosine transform (IDCT) operation for the variable-length decoded data.

4. A video segment reproducing method for a digital video cassette recorder, for reproducing a video segment consisting of a predetermined number of sync blocks, state information bits and quantization information bits, the method comprising the steps of:

error-correction decoding reproduced sync block data;

saving the sync block data in a first frame buffer;

forming a segment with data corresponding to the predetermined number of sync blocks;

determining whether or not the sync block data is reproduced in a variable-speed mode and processing continuous data bits only between discrete cosine-transformed (DCT) blocks within one of the predetermined number of sync blocks when it is determined that the sync block data is reproduced in the variable-speed mode, and processing continuous data bits between DCT blocks within one of the predetermined number of sync blocks and between ones of the predetermined number of sync blocks within the video segment when it is determined that the sync block data is not reproduced in the variable-speed mode, thereby producing processed data;

variable-length decoding the processed data, thereby producing variable-length decoded data;

performing an inverse discrete cosine transform (IDCT) operation on the variable-length decoded data;

determining whether there is any remaining error in the variable-length decoded data, and selecting the variable-length decoded sync block data of a previous frame if an error remains, and selecting the variable-length decoded sync block data of a current frame if no error remains.

5. A video segment reproducing apparatus as set forth in claim 1, wherein the predetermined number of sync blocks is 5.

6. A video segment reproducing apparatus as set forth in claim 2, wherein the predetermined number of sync blocks is 5.

7. A video segment reproducing method as set forth in claim 3, wherein the predetermined number of sync blocks is 5.

8. A video segment reproducing method as set forth in claim 4, wherein the predetermined number of sync blocks is 5.

9. A video segment reproducing apparatus as set forth in claim 1, wherein said controller comprises:
- a sync block buffer for inputting the error corrected data and for storing the error corrected data in a sync block unit;
- a state bit (STA) detector and control signal detector for detecting STA bits of the error corrected data and generating an STA detection signal and a control signal;
- a memory write controller for controlling the writing of the error corrected data to said frame memory according to the STA detection signal, so that the error corrected data is not written into said frame memory when the STA detection signal indicates an error in the error corrected data;
- a memory read controller for reading the error corrected data from said frame memory according to the control signal output by said state bit (STA) detector and control signal detector.

10. A video segment reproducing apparatus as set forth in claim 2, wherein said controller comprises:
- a sync block buffer for inputting the error corrected data and for storing the error corrected data in a sync block unit;
- a state bit (STA) detector and control signal detector for detecting STA bits of the error corrected data and generating an STA detection signal and a control signal;
- a memory write controller for controlling the writing of the error corrected data to said first frame memory according to the STA detection signal, so that the error corrected data is not written into said first frame memory when the STA detection signal indicates an error in the error corrected data;
- a memory read controller for reading the error corrected data from said first frame memory according to the control signal output by said state bit (STA) detector and control signal detector.

* * * * *